(12) United States Patent
Han et al.

(10) Patent No.: US 8,666,695 B2
(45) Date of Patent: Mar. 4, 2014

(54) REAL-TIME MOTION RECOGNITION SYSTEM AND METHOD

(75) Inventors: Seung Ju Han, Seoul (KR); Jung Bae Kim, Hwaseong-si (KR); Chi Youn Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 506 days.

(21) Appl. No.: 12/805,096

(22) Filed: Jul. 12, 2010

(65) Prior Publication Data

US 2011/0071789 A1 Mar. 24, 2011

(30) Foreign Application Priority Data

Sep. 22, 2009 (KR) .................. 10-2009-0089810

(51) Int. Cl.
*G01P 5/00* (2006.01)
*G05B 19/18* (2006.01)
*G01B 3/30* (2006.01)

(52) U.S. Cl.
USPC ............................ 702/142; 700/66; 73/1.79

(58) Field of Classification Search
USPC ......... 702/142, 33, 56, 81, 84, 127, 141, 145, 702/149–153, 182–183, 188–189; 73/1.37–1.38, 1.75–1.77, 1.79, 488, 73/490, 503.3, 504.02–504.03, 73/514.01–514.02; 700/56, 58, 61–66, 69
See application file for complete search history.

(56) References Cited

FOREIGN PATENT DOCUMENTS

| JP | 08-305358 | 11/1996 |
|---|---|---|
| JP | 2000-317134 | 11/2000 |
| JP | 2004-177686 | 6/2004 |
| KR | 10-0312750 | 10/2001 |
| KR | 2003046094 A | * 6/2003 |

OTHER PUBLICATIONS

KR2003046094A, Jun. 2003, English Version, 16 pp.*
Abstract of KR2003046094A, Jun. 2003, English Version, 2 pp.*
Bashir et al., Real-Time Motion Trajectory-Based Indexing and Retrieval of Video Sequences, Jan. 2007, IEEE Transactions on Multimedia, vol. 9, No. 1, pp. 58-65.*
Cho et al., Magic Wand: A Hand-Drawn Gesture Input Device in 3-D Space with Inertial Sensors, 2004 IEEE, Proceedings of the 9th International Workshop on Frontiers in Handwriting Recognition, 6 pp.*

* cited by examiner

*Primary Examiner* — Toan Le
(74) *Attorney, Agent, or Firm* — Staas & Halsey LLP

(57) ABSTRACT

A system and method that may sense and recognize a motion of a user is provided. The system and method may recognize a variety of motions of the user based on sensing data received from a remote controller.

19 Claims, 8 Drawing Sheets

REAL-TIME MOTION RECOGNITION SYSTEM AND METHOD

CROSS-REFERENCE TO RELATED APPLICATIONS

This application claims the benefit of Korean Patent Application No. 10-2009-0089810, filed on Sep. 22, 2009, in the Korean Intellectual Property Office, the disclosure of which is incorporated herein by reference.

BACKGROUND

1. Field

One or more embodiments relate to a motion recognition system and method that may recognize a motion of a user using sensing data.

2. Description of the Related Art

Currently, there has been increased interest in tangible games. A method of recognizing a motion of a user using a sensor may also be used for such tangible games.

In tangible games, since a recognized user's motion may be reflected in an object displayed on a screen, the user's satisfaction may vary depending on the recognition rate of the user's motion. Accordingly, research has thus been conducted toward increasing a user's satisfaction.

SUMMARY

According to one or more embodiments, there may be provided a real-time motion recognition system, including a calculation unit to calculate a curvature of a remote controller based on sensing data received from the remote controller, and a recognition unit to recognize a motion of a user based on the calculated curvature.

The sensing data may include at least one of an acceleration, an angular velocity, a pointing vector, and position data of the remote controller.

The recognition unit may recognize at least one of a speed, a dynamics motion, and a type of the motion based on the calculated curvature.

The calculation unit may calculate at least one of a velocity, pointing position coordinates, and a directional vector of the remote controller based on the sensing data, and the recognition unit may recognize at least one of a speed, a dynamics motion, a type, and a direction of the motion based on at least one of the calculated velocity, pointing position coordinates, and directional vector of the remote controller.

According to one or more embodiments, there may be provided a real-time motion recognition method, including receiving sensing data, calculating a curvature of a remote controller based on the received sensing data, and recognizing a motion of a user based on the calculated curvature.

Additional aspects and/or advantages will be set forth in part in the description which follows and, in part, will be apparent from the description, or may be learned by practice of the invention.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
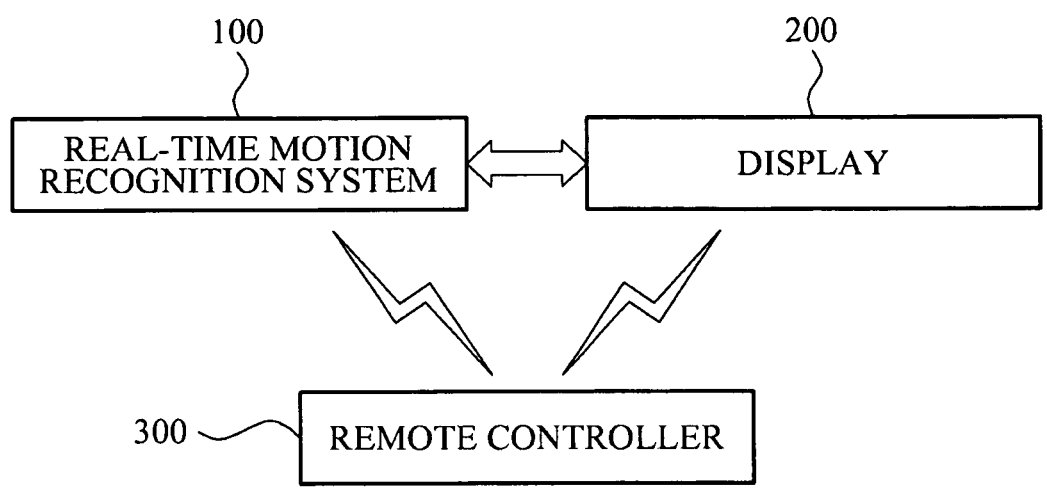
FIG. 1 illustrates a diagram of devices interoperating with a real-time motion recognition system, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

According to one or more embodiments, a method to enable a user to conduct a virtual orchestra is provided. In this instance, a type, a speed, a dynamics motion, and a direction of a user's motion may be recognized, a beat, a tempo, a volume, and a pointing motion may be adjusted for a music performance, and a video and audio stream may be controlled to conduct the virtual orchestra.

FIG. 1 illustrates a diagram of devices interoperating with a real-time motion recognition system 100, according to one or more embodiments.

As illustrated in FIG. 1, the real-time motion recognition system 100 may wirelessly receive sensing data from a remote controller 300, and recognize a motion of a user using the received sensing data. In this instance, the real-time motion recognition system 100 may include an ultrasonic wave sensor and an inertial sensor to sense a movement of a remote controller 300, and transmit sensing data corresponding to the sensed movement to the real-time motion recognition system 100. The inertial sensor may be an acceleration sensor, a gyro sensor, and the like.

Also, the real-time motion recognition system 100 may control objects in virtual space based on the recognized motion. Here, the objects may be displayed on a display 200, and the display 200 may wirelessly communicate with the remote controller 300. In this instance, although it is illustrated that the real-time motion recognition system 100 and the display 200 are connected by wire in FIG. 1, the real-time motion recognition system 100 and the display 200 may wirelessly communicate with each other.

Figure 2:
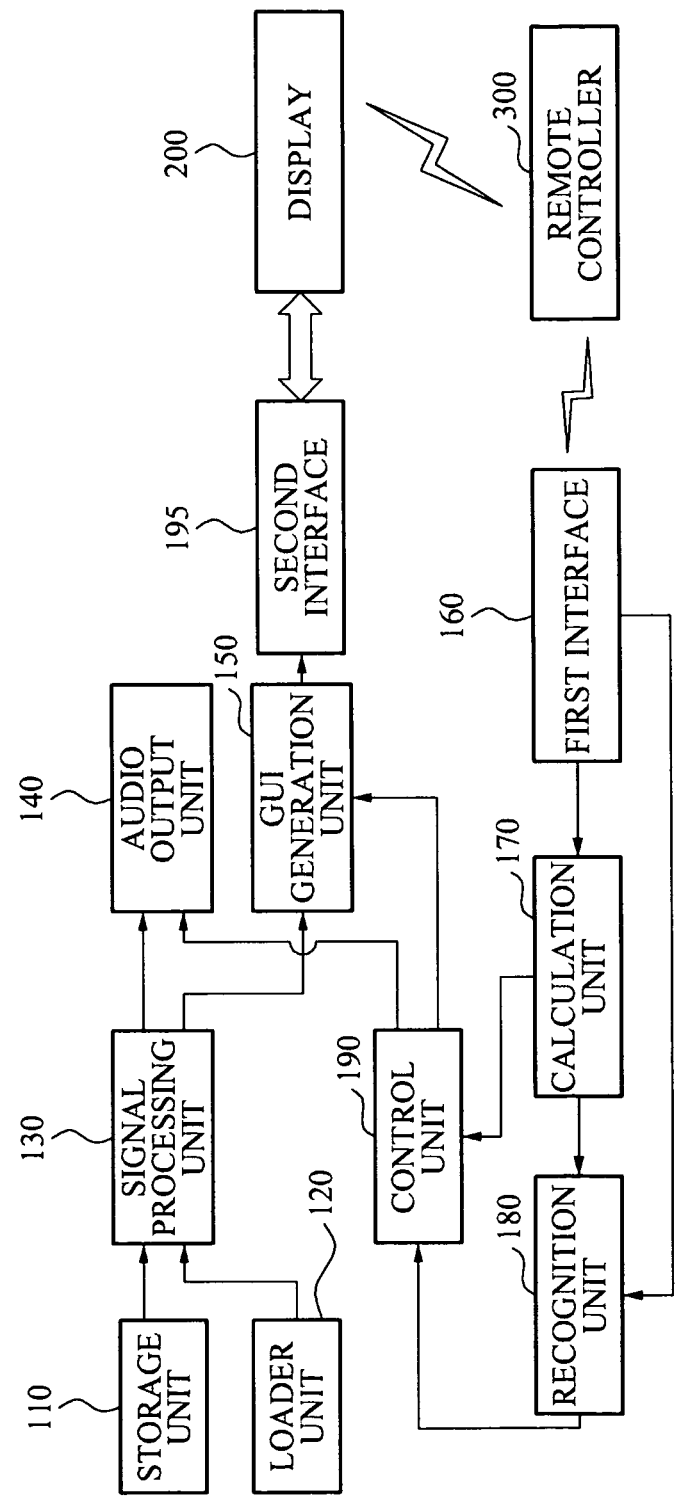
FIG. 2 illustrates a block diagram of a configuration of a real-time motion recognition system, according to one or more embodiments.

FIG. 2 illustrates a block diagram of a configuration of a real-time motion recognition system 100, according to one or more embodiments. Referring to FIG. 2, the real-time motion recognition system 100 may include a storage unit 110, a loader unit 120, a signal processing unit 130, an audio output unit 140, a Graphical User Interface (GUI) generation unit 150, a first interface 160, a calculation unit 170, a recognition unit 180, a control unit 190, and a second interface 195.

The storage unit 110 may store a variety of programs to control all operations of the real-time motion recognition system 100, and control multimedia content to be displayed on a display 200 such as an image, a game, and the like.

The loader unit 120 may read the multimedia content from a recording medium, and output the multimedia content to the signal processing unit 130. For example, the recording medium may be a Compact Disc (CD), a Digital Versatile Disc (DVD), a Blue-ray Disc (BD), and the like.

The signal processing unit 130 may perform signal processing such as a video decoding, video scaling, audio decoding, and the like, with respect to the multimedia content received from the storage unit 110 and the loader unit 120. Also, the signal processing unit 130 may perform signal processing and transmit an audio signal to the audio output unit 140, and an image signal to the GUI generation unit 150, respectively.

The audio output unit 140 may output the audio signal, transmitted from the signal processing unit 130, through a speaker, or through an external device connected to an external output connector. The speaker and the external output connector are not illustrated in FIG. 2.

The GUI generation unit 150 may generate a GUI to provide to the user, and may include the generated GUI in the image transmitted from the signal processing unit 130.

The first interface 160 may receive sensing data from the remote controller 300. Here, the sensing data may include at least one of an acceleration, an angular velocity, a pointing vector, an operation command and position data of the remote controller 300. For example, the first interface 160 may be a Radio Frequency (RF) communication module, a Bluetooth module, and the like. Here, the pointing vector may indicate a vector associated with a pointing direction, output from a gyro sensor, and a pointing position output from the ultrasonic sensor.

The calculation unit 170 may calculate a velocity, a curvature, pointing position coordinates, and a directional vector of the remote controller 300 based on the sensing data received from the first interface 160.

Specifically, the calculation unit 170 may calculate the velocity of the remote controller 300 using the acceleration received from the first interface 160. Here, an operation of calculating the velocity from the acceleration is not described since it is known to those skilled in the relevant art.

Also, the calculation unit 170 may calculate the curvature of the remote controller 300 using the calculated velocity and acceleration received from the first interface 160. Here, the curvature of the remote controller 300 may indicate a rate of change with respect to a movement direction and a movement distance of the remote controller 300 when the remote controller 300 moves at the calculated velocity, for example. Here, the movement direction may vary depending on the movement distance of the remote controller 300. In this instance, as an example, the curvature, calculated by the calculation unit 170, in a three-dimensional (3D) space may be given by, the below Equation 1, also as an example.

$$F[x, y, z] = \frac{\sqrt{(z''y' - y''z')^2 + (x''z' - z''x')^2 + (y''x' - x''y')^2}}{(x'^2 + y'^2 + z'^2)^{3/2}} \quad \text{Equation 1}$$

Here, F[x, y, z] may denote the curvature. Also, x', y', and z' may denote a velocity of each axis, and x", y", and z" may denote an acceleration of each of the axes.

Also, the calculation unit 170 may calculate magnitudes of the velocity, the acceleration, the angular velocity, and the curvature of the remote controller 300, and calculate a time interval. The time interval may be a difference between a current time point $t_1$ and a previous time point $t_2$. The current time point $t_1$ and previous time point $t_2$ may be based on when, respectively at different time points, at least two from among a minimum value of the calculated magnitude of each of the velocity, acceleration, and angular velocity and a maximum value of the curvature respectively match within respective predetermined error ranges.

Figure 3:
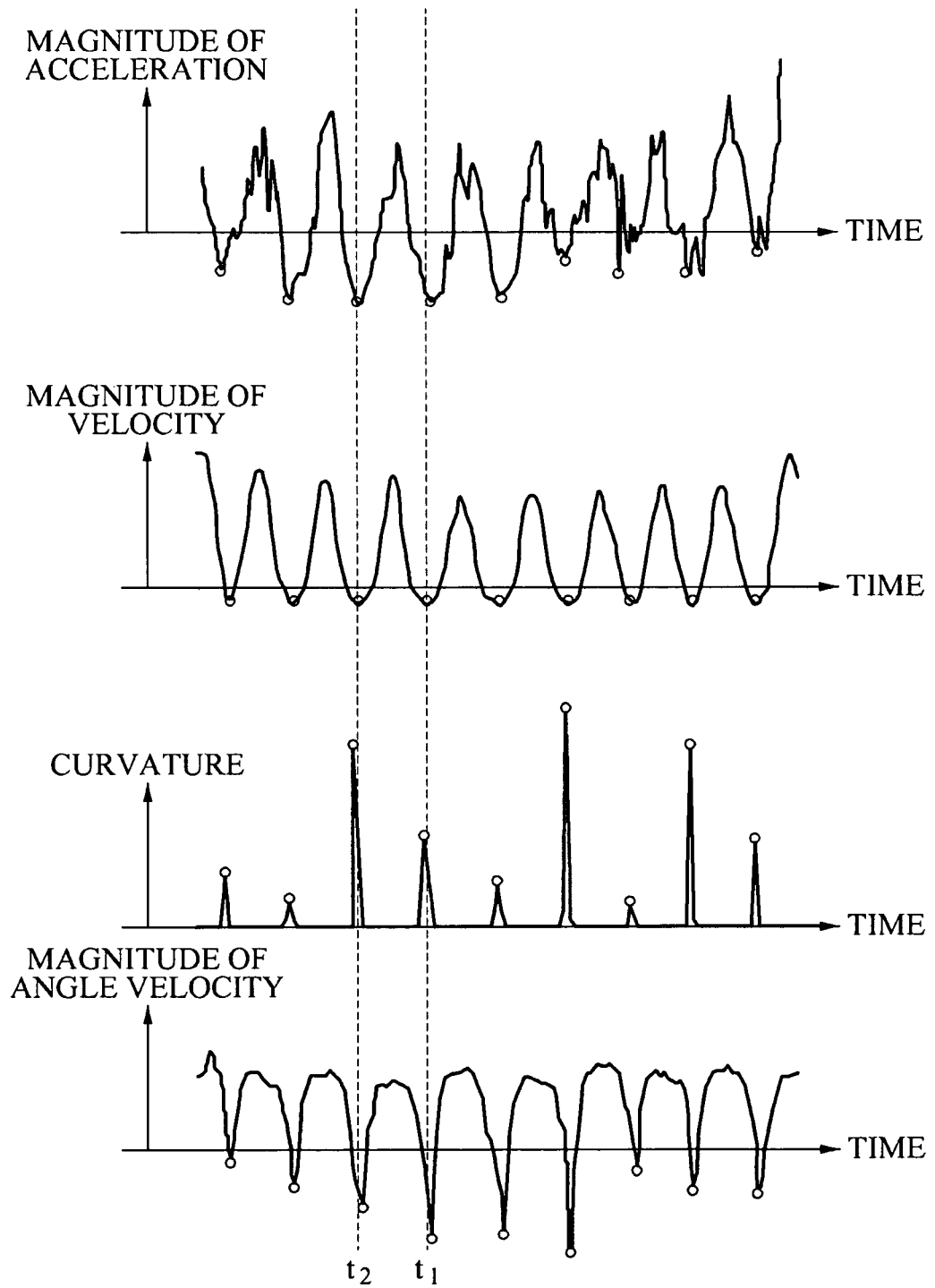
FIG. 3 illustrates a diagram of magnitudes of sensing data based on a time axis in a real-time motion recognition system, according to one or more embodiments.

That is, as illustrated in FIG. 3, the calculation unit 170 may calculate, as the time interval, the difference between a current time point $t_1$ and a previous time point $t_2$, when at least two or all the magnitudes of the velocity, the acceleration, the angular velocity and the curvature respectively match at each of the determined current time point $t_1$ and previous time point $t_2$. Here, the calculated time interval may be $|t_1 - t_2|$. In this instance, the current time point may indicate a point in time when a motion of the remote controller 300 changes, and the previous time point may indicate a point in time when a motion of the remote controller 300 changes before the current time point.

Also, the calculation unit 170 may calculate a distance interval by converting the time interval, calculated based on a time axis, based on a distance axis. That is, the calculated distance interval may be given by, the below Equation 2, for example.

$$dist = \sum_{t_1}^{t_2} \sqrt{(X_{t+1} - x_t)^2 + (y_{t+1} - y_t)^2 + (z_{t+1} - z_t)^2} \quad \text{Equation 2}$$

Here, dist may denote the distance interval. Also, $t_1$ may denote a current time point, $t_2$ may denote a previous time point, and (x, y, z) may denote coordinates value of the remote controller 300 in 3D space.

Also, the calculation unit 170 may calculate a directional vector of the remote controller 300 using the position data, received from the first interface 160, that is, the position coordinates.

Specifically, the calculation unit 170 may convert previous position coordinates before the remote controller 300 moves in 3D space and current position coordinates after moving into position coordinates in a two-dimensional (2D) space. Also, the calculation unit 170 may calculate a movement distance and a movement angle of the remote controller 300 using the previous position coordinates and the current position coordinates in 2D space. Here, since a motion estimation algorithm to calculate the movement distance and the movement angle of the remote controller 300 is known, further detailed description is omitted here.

Figure 4:
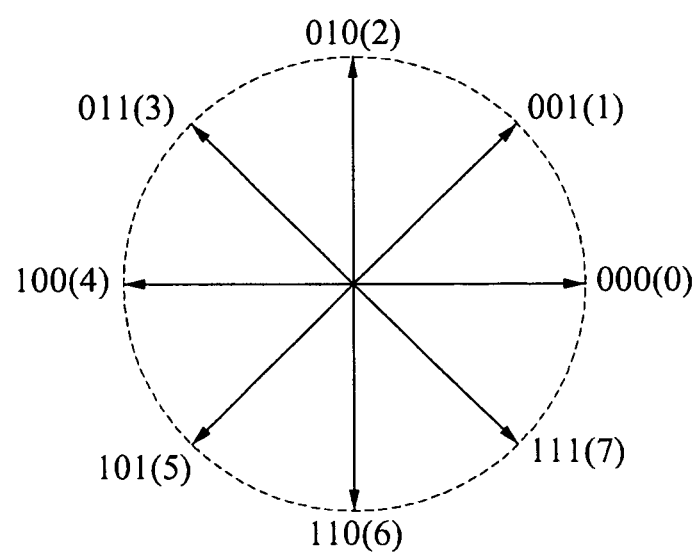
FIG. 4 illustrates eight directional vectors provided in a real-time motion recognition system, according to one or more embodiments.

Also, as illustrated in FIG. 4, the calculation unit 170 may calculate at least one of directional vectors of predetermined directions as the directional vector of the remote controller 300, using the movement distance and the movement angle. Here, the direction may be 4, 8, 16, and 32 predetermined directions, for example. FIG. 4 illustrates a directional vector of eight directions.

Also, the calculation unit 170 may calculate pointing position coordinates based on the pointing vector of the remote controller 300 received from the first interface 160.

For example, when a virtual orchestra is conducted, and the remote controller 300 is used for pointing to a predetermined performance part, the calculation unit 170 may convert movement coordinates of the remote controller 300 in 3D space into coordinates in 2D space, and thereby may calculate a pointing position of the remote controller 300 in the display 200.

The recognition unit 180 may recognize the speed, the dynamics motion, the type, and the direction of the motion using the calculated time interval, distance interval, directional vector, pointing position coordinates, the magnitude of the acceleration, the magnitude of the angular velocity, the magnitude of the velocity, and the curvature, as well as the operation command received from the first interface 160.

Specifically, the recognition unit 180 may recognize the speed of the motion according to the time interval calculated by the calculation unit 170. In this instance, the recognition unit 180 may recognize that the speed of the motion is fast when the calculated time interval decreases, and may recognize that the speed of the motion is slow when the calculated time interval increases. For example, the speed of the motion may represent a tempo in music performance.

Also, the recognition unit 180 may recognize the dynamics motion of the motion according to the calculated distance interval. In this instance, the recognition unit 180 may recognize that the dynamics motion of the motion is large when the calculated distance interval increases, and recognize that the dynamics motion of the motion is small when the calculated distance interval decreases. For example, the dynamics motion of the motion may be a volume in music performance. In this case, the recognition unit 180 may recognize that a volume increases when the dynamics motion of the motion increases, and recognize that the volume decreases when the dynamics motion of the motion decreases.

Also, the recognition unit 180 may recognize the type of the motion by applying the calculated directional vector, magnitude of the acceleration, magnitude of the angular velocity, magnitude of the velocity, and the curvature to a recognition algorithm such as a Hidden Markov Model (HMM). For example, the type of the motion may be a beat in music performance. Since a technology recognizing the type of the motion using a recognition algorithm is known, further detailed description is omitted here.

For example, when the user conducts the virtual orchestra using the remote controller 300, the recognition unit 180 may analyze a movement pattern of the remote controller 300 by applying the calculated directional vector, magnitude of the acceleration, magnitude of the angular velocity, magnitude of the velocity, and curvature to a recognition algorithm such as an HMM. Accordingly, the recognition unit 180 may recognize which beat of predetermined beats is the type of the motion. Here, the beat may include two beats, three beats, four beats, six beats, and unknown beats.

Also, the recognition unit 180 may recognize the direction of the motion based on the pointing vector of the remote controller 300 received from the first interface 160, and the directional vector calculated by the calculation unit 170.

For example, when the user conducts the virtual orchestra using the remote controller 300, the recognition unit 180 may recognize the direction of the motion as a direction of the directional vector, when a direction of the pointing vector is identical to the direction of the directional vector of the remote controller 300. Also, the recognition unit 180 may recognize the direction of the motion as a perpendicular direction of the directional vector, when the direction of the pointing vector is different from the direction of the directional vector.

The control unit 190 may control the GUI generation unit 150, the audio output unit 140, and the second interface 195 to enable the speed, the dynamics motion, the type, and the direction of the motion to be taken into account in objects in virtual space. The objects may be displayed on the display 200. That is, an image, output from the GUI generation unit 150, may be displayed on the display 200 through the second interface 195. For example, the object displayed on the display 200 may be an avatar.

Also, the control unit 190 may control an operation of objects, corresponding to a pointed position on the display 200, based on the operation command and the pointing position coordinates. The operation command may be received from the first interface 160, and the pointing position coordinates may be calculated by the calculation unit 170.

Specifically, when the calculated pointing position coordinates indicates a performance part of a percussion instrument and the operation command indicates a start of the performance, the control unit 190 may control the GUI generation unit 150 and the audio output unit 140 to start from the performance part of the percussion instrument from among the orchestra displayed on the display 200. Here, the operation command may include a start and an end of performance, and be received from an operation unit. The operation unit is not illustrated and may be included in the remote controller 300. For example, the operation unit may be an operation button, a touch panel, and the like.

Figure 5:
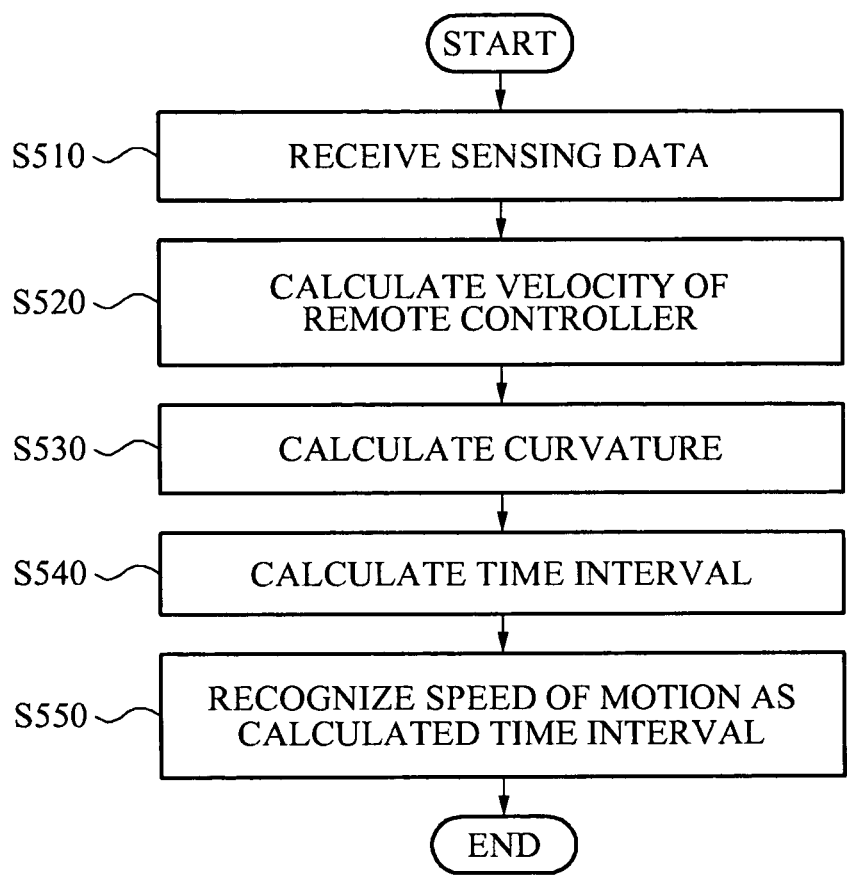
FIG. 5 illustrates a flowchart of a method of recognizing a speed of a user's motion in a real-time motion recognition system, according to one or more embodiments.

FIG. 5 illustrates a flowchart of a method of recognizing a speed of a user's motion in a real-time motion recognition system, according to one or more embodiments.

In operation S510, a first interface 160 may receive sensing data from a remote controller 300. Here, the sensing data may include at least one of an acceleration, an angular velocity, a pointing vector, an operation command, and position data of the remote controller 300.

In operation S520, a calculation unit 170 may calculate the velocity of the remote controller 300 based on the acceleration of the remote controller 300.

In operation S530, the calculation unit 170 may calculate a curvature of the remote controller 300 based on the calculated velocity and acceleration. Since it has been described that the curvature may be calculated according to Equation 1, for example, further detailed description is omitted here.

In operation S540, the calculation unit 170 may calculate magnitudes of the velocity, the acceleration, and the angular velocity of the remote controller 300, and calculate a time interval based on the calculated magnitude of the velocity, the magnitude of the acceleration, the magnitude of the angular velocity, and the calculated curvature. Here, the time interval may be a difference between a current time point and a previous time point. The current time point may indicate a point in time when a motion of a user using the remote controller changes, and the previous time point may indicate a point in time when a motion of the remote controller changes before the current time point.

Specifically, the calculation unit 170 may calculate, as the time interval, a difference of time when at least two from among a minimum value of the calculated magnitude of each of the velocity, acceleration, and angular velocity and a maximum value of the curvature respectively match within respective predetermined error ranges.

In operation S550, the recognition unit 180 may recognize the speed of the motion according to the calculated time interval. In this instance, the recognition unit 180 may recognize that the speed of the motion is fast when the calculated time interval decreases, and recognize that the speed of the motion is slow when the calculated time interval increases.

Figure 6:
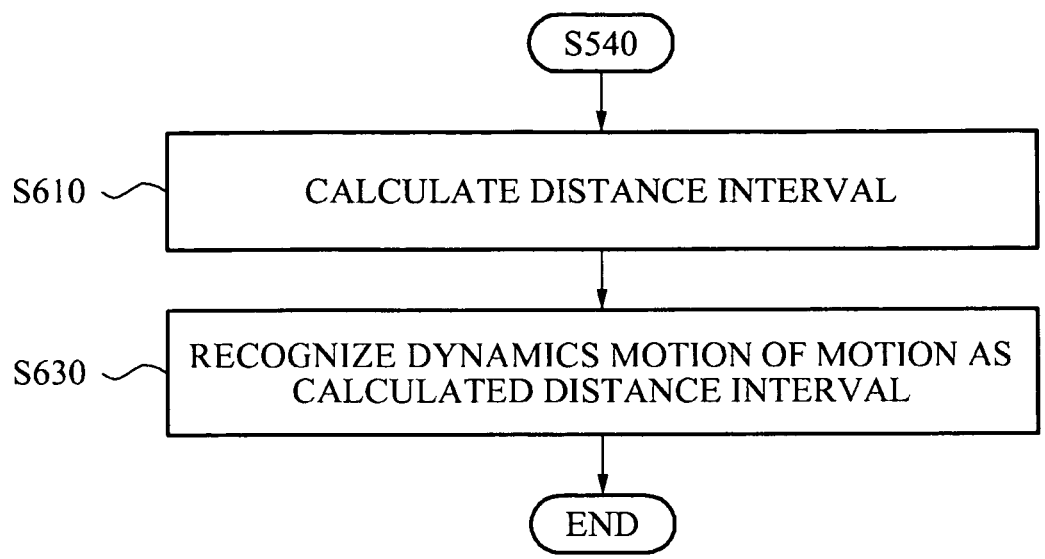
FIG. 6 illustrates a flowchart of a method of recognizing a dynamics motion of a user's motion in a real-time motion recognition system, according to one or more embodiments.

FIG. 6 illustrates a flowchart of a method of recognizing a dynamics motion of a user's motion in a real-time motion recognition system, according to one or more embodiments.

In operation S610, the calculation unit 170 may calculate a distance interval by converting the time interval, calculated based on a time axis, based on a distance axis. For example, when the speed of the motion is a tempo, the calculation unit 170 may calculate a distance interval in a single tempo. Since it has been described that the distance interval may be calculated according to Equation 2, for example, further detailed description is omitted here.

In operation S630, the recognition unit 180 may recognize a dynamics motion of the motion according to the calculated distance interval. Here, the recognition unit 180 may recognize that the dynamics motion of the motion is large when the calculated distance interval increases, and recognize that the dynamics motion of the motion is small when the calculated distance interval decreases. For example, when the dynamics motion of the motion is a volume, the recognition unit 180 may recognize a distance interval in a single tempo as the volume. Accordingly, the recognition unit 180 may recognize that the volume decreases when the dynamics motion of the motion decreases, and recognize that the volume increases when the dynamics motion of the motion increases.

It has been described that the distance interval calculated in operation S610 is recognized as the dynamics motion of the motion in operation S630, and the dynamics motion of the motion may be recognized using a directional vector and the angular velocity of the remote controller 300.

For example, when the dynamics motion of the motion indicates a volume, the recognition unit 180 may recognize that the volume is high, when a predetermined reference side of the remote controller 300 is upward. The reference side may be calculated by the calculation unit 170. Also, the recognition unit 180 may recognize that the volume is low, when the predetermined reference side of the remote controller 300 is downward. In this instance, when the reference side moves upwards faster using the angular velocity, the recognition unit 180 may recognize that the volume gradually increases, and when the reference side moves upwards slower using the angular velocity, the recognition unit 180 may recognize that the volume gradually decreases.

Figure 7:
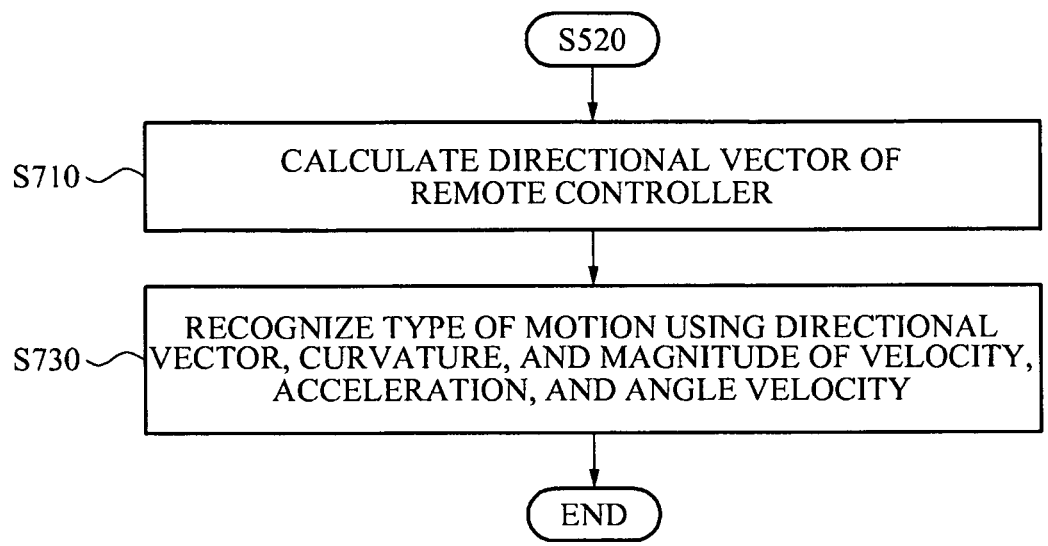
FIG. 7 illustrates a flowchart of a method of recognizing a type of a user's motion in a real-time motion recognition system, according to one or more embodiments.

FIG. 7 illustrates a flowchart of a method of recognizing a type of a user's motion in a real-time motion recognition system, according to one or more embodiments.

In operation S710, the calculation unit 170 may calculate the directional vector of the remote controller 300 using position data included in the sensing data. Here, the position data may indicate position coordinates of the remote controller 300 in 3D space.

Specifically, the calculation unit 170 may convert previous position coordinates before the remote controller 300 moves in 3D space and current position coordinates after moving into position coordinates in 2D space. Also, the calculation unit 170 may calculate a movement distance and a movement angle of the remote controller 300 using the previous position coordinates and the current position coordinates. Also, the calculation unit 170 may calculate, as the directional vector of the remote controller 300, any one of eight predetermined directional vectors using the movement distance and the movement angle. Here, the eight directional vectors are illustrated in FIG. 4.

In operation S730, the recognition unit 180 may recognize the type of the motion by applying the calculated directional vector, magnitude of the acceleration, magnitude of the angular velocity, magnitude of the velocity, and curvature to a recognition algorithm. Since a technology recognizing a type of the motion using a recognition algorithm is known, further detailed description is omitted here.

Figure 8:
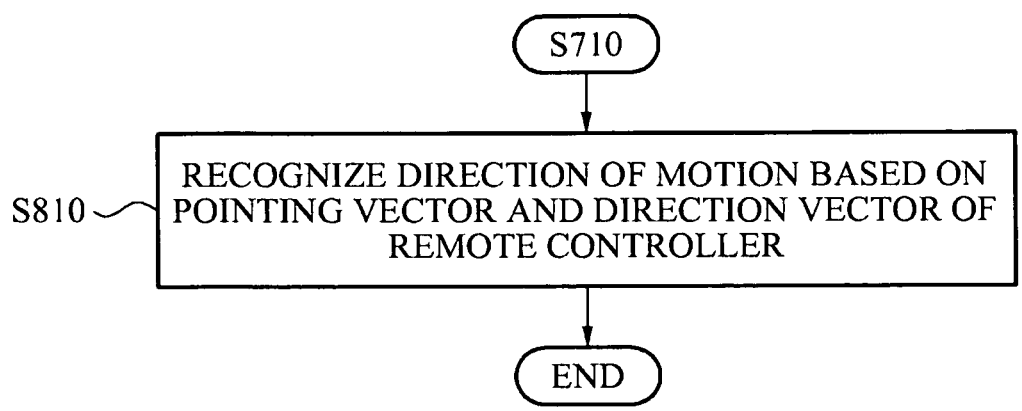
FIG. 8 illustrates a flowchart of a method of recognizing a direction of a user's motion in a real-time motion recognition system, according to one or more embodiments.

FIG. 8 illustrates a flowchart of a method of recognizing a direction of a user's motion in a real-time motion recognition system, according to one or more embodiments.

In operation S810, the recognition unit 180 may recognize the direction of the motion based on the calculated pointing vector and the directional vector.

Specifically, the recognition unit 180 may recognize the direction of the motion as a direction of the directional vector, when a direction of the pointing vector is identical to the direction of the directional vector of the remote controller 300. Also, the recognition unit 180 may recognize the direction of the motion as a perpendicular direction of the directional vector, when the direction of the pointing vector is different from the direction of the directional vector.

Although it has been described that the direction of the motion is recognized in FIG. 8, the real-time motion recognition system may not be limited thereto, and may recognize a pointing direction corresponding to a portion to be controlled.

For example, when an orchestra is displayed on a display 200, the calculation unit 170 may calculate pointing position coordinates based on the pointing vector included in the sensing data, and the recognition unit 180 may recognize an orchestra part indicated by the calculated pointing position coordinates. Here, the pointing position coordinates may correspond to a portion where the remote controller 300 points on the display 200.

Although it has been described that sensing data, received from a remote controller, includes an acceleration, an angular velocity, a pointing vector, and position data, the sensing data may not be limited to such embodiments. The sensing data may be a bitstream to calculate each of the acceleration, the angular velocity, the pointing vector, and the position data. That is, a calculation unit 170 may receive sensing data, which is a bitstream, and calculate the acceleration, the angular velocity, the pointing vector, and the position data of the remote controller.

Also, although it has been described that a remote controller transmits sensing data to a real-time motion recognition system using an ultrasonic wave sensor and an inertial sensor, the remote controller may not be limited to such embodiments. The remote controller may transmit sensing data, generated by sensing a motion of the remote controller using a camera, to the real-time motion recognition system.

Also, although it has been described that a real-time motion recognition system recognizes a speed, a dynamics motion, a type, and a direction of a user's motion using sensing data, which is received from a single remote controller, the real-time motion recognition system may not be limited to such embodiments. The real-time motion recognition system may recognize a speed, a dynamics motion, a type, and a direction of a user's motion of each of a plurality of remote controllers using sensing data received from the plurality of remote controllers.

Also, when a device to recognize a speed, a dynamics motion, and a type of a user's motion is separated from a device to recognize a direction of the user's motion in a plurality of remote controllers, a real-time motion recognition system may divide and recognize a user's motion of each of the plurality of remote controllers. In this instance, functions of the plurality of remote controllers may be divided to enable user's motions of at least two different categories from among four user's motions to be overlapped with each other.

That is, when a first remote controller and a second remote controller exist, the first remote controller may be set to recognize a speed, a dynamics motion, and a type of a user's motion, and the second remote controller may be set to recognize a direction of the user's motion. Through this, the real-time motion recognition system may distinguish and recognize the motion of the user that controls the first remote controller and the second remote controller, based on sensing data received from each of the first remote controller and the second remote controller.

A speed, a dynamics motion, a type, a direction, and the like of a user's motion may be recognized using sensing data.

The real-time motion recognition method according to the above-described embodiments may be recorded in computer-readable media as computer readable code, such as program instructions, to implement various operations embodied by at least one processing devices, such as a processor or a computer, for example. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A real-time motion recognition system, comprising:
    a calculation unit to calculate a curvature vector for a manipulated remote controller based on sensing data received from the remote controller; and
    a recognition unit to recognize a motion of a user based on the calculated curvature vector,
    wherein the sensing data includes at least one of an acceleration, an angular velocity, a pointing vector, and position data of the remote controller,
    wherein the curvature vector indicates a rate of change with respect to a movement direction and movement distance of the remote controller, and
    wherein the calculation unit calculates a velocity of the remote controller using the sensing data, and calculates the curvature vector based on the calculated velocity and the acceleration.

2. The real-time motion recognition system of claim 1, wherein the recognition unit recognizes at least one of a speed, a dynamics motion, and a type of the motion based on the calculated curvature vector.

3. The real-time motion recognition system of claim 1, wherein, the calculation unit calculates at least one of pointing position coordinates and a directional vector of the remote controller based on the sensing data, and
    the recognition unit recognizes at least one of a speed, a dynamics motion, a type, and a direction of the motion based on at least one of the calculated velocity, pointing position coordinates, and directional vector of the remote controller.

4. The real-time motion recognition system of claim 3, wherein the calculation unit calculates magnitudes of the velocity, the acceleration, and the angular velocity, and the recognition unit recognizes the speed of the motion based on at least one of the magnitude of the velocity, the magnitude of the acceleration, the magnitude of the angular velocity, and the curvature vector.

5. The real-time motion recognition system of claim 3, wherein the calculation unit calculates magnitudes of the velocity, the acceleration, and the angular velocity of the remote controller, and the recognition unit recognizes the dynamics motion of the motion based on at least one of the magnitude of the velocity, the magnitude of the acceleration, the magnitude of the angular velocity, and the curvature vector of the remote controller.

6. The real-time motion recognition system of claim 5, wherein the dynamics motion of the motion indicates a control of auditory volume.

7. The real-time motion recognition system of claim 3, wherein the recognition unit recognizes the type of the motion based on the curvature vector and at least one of the velocity, the acceleration, and the directional vector of the remote controller.

8. The real-time motion recognition system of claim 7, wherein the type of the motion indicates a beat.

9. The real-time motion recognition system of claim 3, wherein the recognition unit recognizes the direction of the motion based on the pointing vector and the directional vector of the remote controller.

10. The real-time motion recognition system of claim 9, wherein the recognition unit recognizes the direction of the motion as a direction of the directional vector, when a direction of the pointing vector is identical to the direction of the directional vector, and recognizes the direction of the motion as a perpendicular direction of the directional vector, when the direction of the pointing vector is different from the direction of the directional vector.

11. The real-time motion recognition system of claim 1, wherein the calculation unit calculates a time interval which is a difference between a current time point and a previous time point, the current time point indicating a point in time when a motion of the remote controller changes, and the previous time point indicating a point in time when a motion of the remote controller changes before the current time point, and
    the recognition unit recognizes a speed of the motion according to the calculated time interval.

12. The real-time motion recognition system of claim 11, wherein the recognition unit recognizes that the speed of the motion is fast when the calculated time interval decreases, and recognizes that the speed of the motion is slow when the calculated time interval increases.

13. The real-time motion recognition system of claim 1, wherein the calculation unit calculates a distance interval of the remote controller in a current time point and a previous time point, the current time point indicating a point in time when a motion of the remote controller changes, and the previous time point indicating a point in time when a motion of the remote controller changes before the current time point, and
    the recognition unit recognizes a dynamics motion of the motion according to the distance interval.

14. The real-time motion recognition system of claim 13, wherein the recognition unit recognizes that the dynamics motion of the motion is large when the calculated distance interval increases, and recognizes that the dynamics motion of the motion is small when the calculated distance interval decreases.

15. A real-time motion recognition method, comprising:
   receiving sensing data;
   calculating, using at least one processing device, a curvature vector for a manipulated remote controller based on the received sensing data; and
   recognizing a motion of a user based on the calculated curvature vector,
   wherein the sensing data includes at least one of an acceleration, an angular velocity, a pointing vector, and position data of the remote controller,
   wherein the curvature vector indicates a rate of change with respect to a movement direction and movement distance of the remote controller,
   wherein the calculating calculates a velocity of the remote controller using the sensing data, and calculates the curvature vector based on the calculated velocity and the acceleration.

16. The real-time motion recognition method of claim 15, wherein the recognizing recognizes at least one of a speed, a dynamics motion, and a type of the motion based on the calculated curvature vector.

17. The real-time motion recognition method of claim 15, wherein the receiving of the sensing data further comprises receiving the sensing data from a remote controller.

18. The real-time motion recognition method of claim 15, wherein the calculating calculates at least one of pointing position coordinates and a directional vector of the remote controller based on the sensing data, and the recognizing recognizes at least one of a speed, a dynamics motion, a type, and a direction of the motion based on at least one of the calculated velocity, pointing position coordinates, and directional vector of the remote controller.

19. A non-transitory computer-readable recording medium encoded with computer-readable code to control at least one processing device to perform a real-time motion recognition method, the method comprising:
   receiving sensing data;
   calculating a curvature vector for a manipulated remote controller based on the received sensing data; and
   recognizing a motion of a user based on the calculated curvature vector,
   wherein the sensing data includes at least one of an acceleration, an angular velocity, a pointing vector, and position data of the remote controller,
   wherein the curvature vector indicates a rate of change with respect to a movement direction and movement distance of the remote controller,
   wherein the calculating calculates a velocity of the remote controller using the sensing data, and calculates the curvature vector based on the calculated velocity and the acceleration.

* * * * *